United States Patent
Ito et al.

(10) Patent No.: US 6,570,282 B1
(45) Date of Patent: May 27, 2003

(54) CYLINDER SERVOMOTOR

(75) Inventors: Hidenobu Ito, Tokyo (JP); Kouichi Takamune, Tokyo (JP); Takao Mizutani, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/959,447
(22) PCT Filed: Feb. 25, 2000
(86) PCT No.: PCT/JP00/01118
   § 371 (c)(1),
   (2), (4) Date: Jan. 28, 2002
(87) PCT Pub. No.: WO01/63731
   PCT Pub. Date: Aug. 30, 2001

(51) Int. Cl.⁷ .................................................. H02K 7/06
(52) U.S. Cl. ....................................... 310/80; 310/75 R
(58) Field of Search ................................. 310/80, 68 B, 310/77, 91, 15, 12, 75 R, 90, 89; 60/545; 91/44, 59; 74/625; 114/150; 414/589

(56) References Cited

U.S. PATENT DOCUMENTS 5,074,160 A * 12/1991 Kasuga ........................ 310/80
5,614,778 A * 3/1997 Terao et al. .................. 310/80

FOREIGN PATENT DOCUMENTS

| EP | 647502 | * | 4/1995 |
| EP | 1182765 | * | 2/2002 |
| EP | 1189331 | * | 3/2002 |
| JP | 11257453 | * | 9/1999 |
| JP | 2002225101 | * | 8/2002 |

* cited by examiner

Primary Examiner—Tran Nguyen
(74) Attorney, Agent, or Firm—Sughrue Mion, PLLC

(57) ABSTRACT

A cylinder servo motor includes a servo motor having a rotor and a stator; a cylinder servo main unit which is connected to a rotary shaft of the rotor of the servo motor by way of a ball screw nut and which has a ball screw shaft, the ball screw shaft moving in an axial direction; a rotation sensor for detecting a rotary position of the servo motor; and control means for controlling the rotation sensor and the servo motor. The cylinder servo motor main unit, the rotation sensor, and the control means are integrated together, thereby providing a cylinder servo motor which obviates a necessity of wiring a line between the servo motor, the rotation sensor, and the control device section at a location to which the cylinder servo motor is to be shipped.

8 Claims, 14 Drawing Sheets

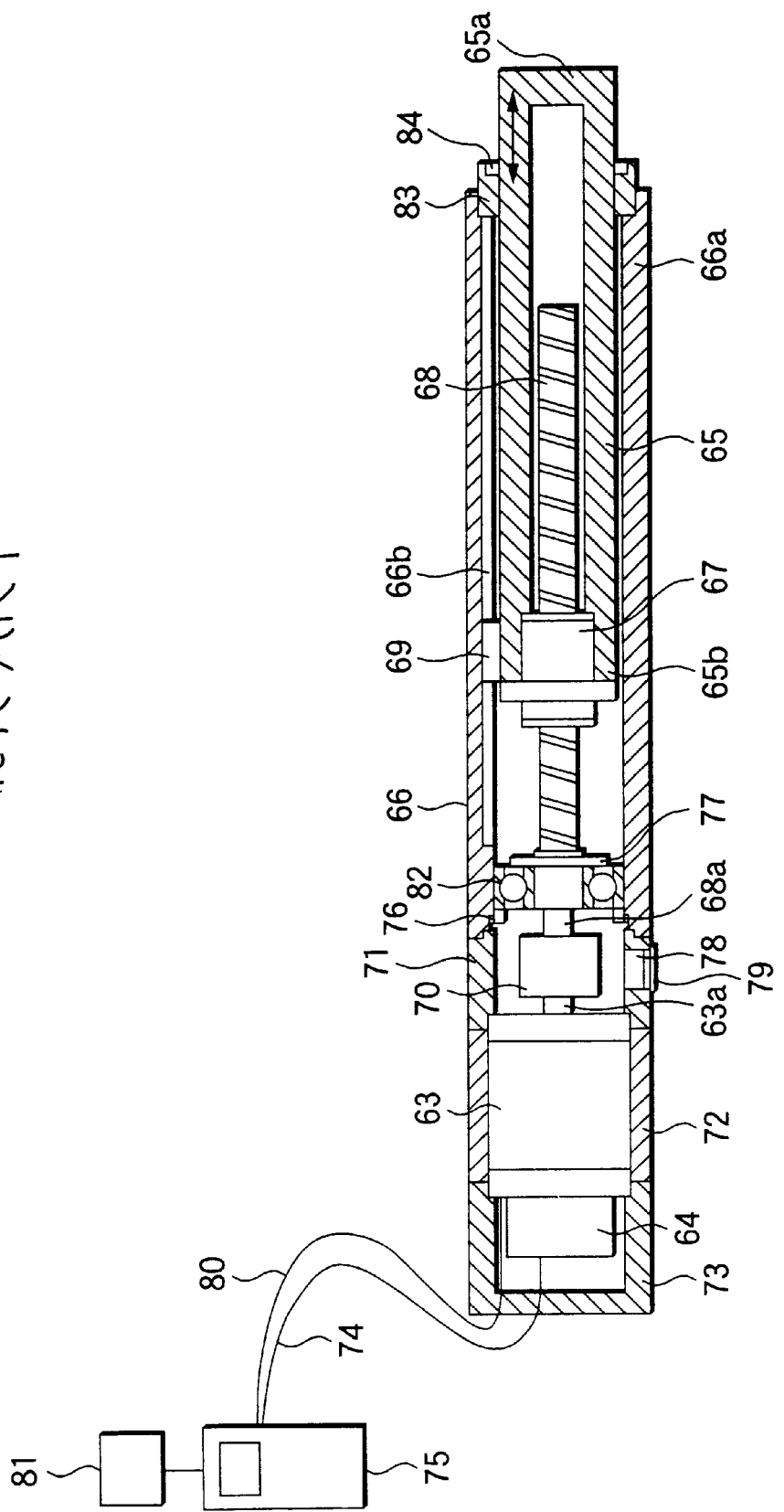

CYLINDER SERVOMOTOR

FIELD OF THE INVENTION

The present invention relates to a cylinder servo motor having integrated therein a controller, a detector, a servo motor, a ball screw nut, and a ball screw shaft.

BACKGROUND OF THE INVENTION

FIG. 14 shows a related-art cylinder servo motor. As shown in the drawing, reference numeral 63 designates a motor serving as a drive source; 64 designates a rotational speed detector for detecting the rotational speed of the motor 63; 68 designates a ball screw shaft; 67 designates a ball screw nut engaged with the ball screw shaft 68; and 65 designates a hollow cylinder rod. A load is connected to a load-side end 65a, and an opposite end 65b of the cylinder rod 65 is fastened to the ball screw nut 67. A rotary shaft bearing 82 is fitted around an end 68a of the ball screw shaft 68. A motor shaft 63a and the end 68a of the ball screw shaft 68 are coupled together by means of a flexible coupling 70. Reference numeral 77 designates an inner ring fastening nut. The inner ring fastening nut 77, along with an outer ring fastening nut 76 screw-engaged with an inner peripheral wall of a cylinder case 66, fixes the rotary shaft bearing 82. The cylinder rod 65 is supported by a sleeve shaft bearing 83 which is fastened to a load-side end 66a of the cylinder case 66 and has an oil seal 84. A slide block 69 is fastened to the cylinder rod 65 and is clearance-fitted to a keyway 66b formed in the cylinder case 66. Reference numeral 71 designates a case, which secures the cylinder case 66 and a motor case 72 that houses and supports the motor 63. Reference numeral 78 designates a hole formed in the case 71; and 79 designates a blank cap. Reference numeral 73 designates a cover of the rotational speed detector 64; and 74 designates a cable of the rotational speed detector 64. Reference numeral 80 designates a power line of the motor 63; 75 designates an amplifier serving as a controller; and 81 designates a higher-level controller.

In the related-art cylinder servo motor having the foregoing construction, power is fed to the motor 63 by way of the amplifier 75 in accordance with an instruction output from the higher-level controller 81, thereby rotating the motor shaft 63 and the ball screw shaft 68. Rotation of the cylinder rod 65 fastened to the ball screw nut 67 is stopped. Hence, the cylinder rod 65 does not rotate in conjunction with rotation of the ball screw shaft 68 and rotates directly along with the ball screw nut 67, thus acting as a cylinder servo motor.

The related-art cylinder servo requires the cable 74 for connecting the rotational speed detector 64 and the amplifier 75, and the power line 80 for connecting the motor 63 with the amplifier 75. The cable 74 and the power line 80 are wired by a machinery manufacturer or an end user. Hence, there sometimes arise problems, such as an operation failure or a failure of the rotational speed detector 64 due to incorrect wiring.

The motor shaft 63a of the motor 63 and the end 68a of the ball screw shaft 68 are coupled together by means of the flexible coupling 70. The coupling 70 requires the case 71, and there must be ensured a space in the axis of ball screw shaft 68, thereby increasing the overall length of the cylinder servo motor.

Since the ball screw shaft 68 is inserted into the cylinder rod 65, only a ball screw shaft which is smaller in diameter than the cylinder rod 65 can be used as the ball screw shaft 68. Hence, if an attempt is made to increase allowable thrust, the cylinder servo motor becomes bulky.

Since the cylinder rod 65 is supported by the sleeve shaft bearing 83, wear arises in the slide section as a result of sliding friction. Particularly, at the time of high-speed operation, the life span of the cylinder serve becomes shorter.

Further, the rotation of the cylinder rod 65 is stopped by means of the slide block 69 clearance-fitted to the keyway 66b. Hence, a contact surface of the cylinder rod 65 is abraded by means of sliding friction, thereby resulting in an increase in backlash.

Contact between the slide block 69 and the keyway 66b arises in the form of sliding friction. Hence, at the time of operation, excessive thrust corresponding to a friction loss in the contact surface is required, thus deteriorating efficiency.

Further, at the time of assembly of a cylinder servo motor, the motor shaft 63a and the end 68a of the ball screw shaft 68 are coupled together by the flexible coupling 70. A set screw (not shown) is fastened to the flexible coupling 70, by use of a hexagonal wrench and by way of a hole 78. To this end, the cylinder rod 65 must be moved along the axis of the ball screw shaft 68, thereby finding a hole for the set screw. This results in an increase in the number of assembly steps, thereby adding to costs.

The present invention has been conceived to solve the drawback of the invention and is aimed at providing a cylinder servo motor capable of eliminating a necessity of wiring operation.

The present invention provides a compact cylinder servo motor which can produce large thrust and a long linear stroke.

The present invention is also aimed at providing an efficient cylinder servo motor having a long life span.

The present invention is also aimed at providing a cylinder servo motor which is superior in ease of assembly.

SUMMARY OF THE INVENTION

A cylinder servo motor according to the present invention comprises:

a servo motor having a rotor and a stator;

a cylinder servo motor main unit which is connected to a rotary shaft of the rotor of the servo motor by way of a ball screw nut and which has a ball screw shaft, the ball screw shaft moving in an axial direction;

a rotation sensor for detecting a rotary position of the servo motor; and control means for controlling the rotation sensor and the servo motor, wherein the cylinder servo motor main unit, the rotation sensor, and the control means are mechanically integrated;

the rotor of the servo motor is constituted of the rotary shaft and a permanent magnet, the rotary shaft being rotatably supported by a load-side bearing supported by a load-side bracket and by a non-load-side bearing supported by a non-load-side bracket, at least the load-side end of the rotary shaft being released, a through hole being formed in the rotary shaft so as to extend in an axial direction, and the permanent magnet being disposed opposite the stator fixed to the rotary shaft with a predetermined clearance therebetween;

the ball screw nut is constituted of a ball circulation mechanism and is mounted on a load-side shaft end of the rotary shaft;

the ball screw shaft is screw-engaged with the ball screw nut so as to become movable in only the axial direction such that a non-load-side shaft end of the ball screw shaft is housed in the through hole of the rotary shaft and such that a load-side end of the ball screw shaft protrudes from the load-side bracket;

a rotation portion of the rotation sensor is coupled to a non-load-side portion of the rotary shaft protruding from the hole formed in the non-load-side bracket and is covered with a rotation sensor cover;

the control means is disposed on a part of the non-load-side bracket distant from the stator; and the control means and the rotation sensor cover are covered with a chassis to be fastened to the non-load-side bracket.

A necessity of wiring a line between the servo motor, the rotation sensor, and the control device section at a location to which the cylinder servo motor is to be shipped is obviated, thereby improving workability. As a result, a wiring failure, which otherwise is apt to arise at a location to which a cylinder servo motor is shipped, is prevented. Further, the wiring operation is obviated, thereby improving workability.

Since there is obviated use of any coupling for coupling a rotary shaft with a ball screw shaft, which would have hitherto been employed, the cylinder servo motor becomes compact despite having a long stroke. Hence, the cylinder servo motor is made compact overall, and the number of components is reduced.

The rotation portion of the rotation sensor is doubly covered with the rotation sensor cover and the chassis. Accordingly, reliability of the cylinder servo motor against an external environment is improved.

According to the present invention, the non-load-side end of the rotary shaft and the through hole are elongated to a position where the control means of the servo motor is disposed. Further, in association with elongation of the non-load-side end and elongation of the through hole, the non-load-side shaft end of the ball screw shaft is elongated.

Hence, there can be obtained a cylinder servo motor which, for a given dimension, has a stroke of comparatively long linear movement.

Further, in the cylinder servo motor according to the present invention, a non-load-side of the through hole of the rotary shaft is opened, and a cover for covering the open side is removably provided. Further, a through hole is formed in a portion of the chassis opposing the cover with reference to an axial direction of the rotary shaft. Moreover, the through hole formed in the chassis is removably provided with a cover.

Accordingly, there can be effected manual positioning of the ball screw shaft while the cylinder servo motor is mounted on a machine, thereby improving workability and operability. At this time, since the cylinder servo motor is provided with a cover for covering the open section of the rotary shaft and a cover for covering a through hole formed in the chassis, good reliability of the rotation section of the rotation sensor against an external environment is achieved.

In the cylinder servo motor according to the present invention, the load-side shaft bearing is constituted of a ball bearing. An outer ring of the ball bearing is fixedly sandwiched between a shoulder section formed on an internal peripheral wall of the load-side bracket and an outer ring fastening nut to be screw-engaged with an internal peripheral wall of the load-side bracket. An inner ring of the ball bearing is fixedly sandwiched between a ball screw nut fastening shoulder section formed on the load-side shaft end of the rotary shaft of the servo motor and an inner ring fastening nut to be screw-engaged with the rotary shaft of the servo motor. An inner diameter of the inner ring of the ball bearing is made greater than an outer diameter of the rotor of the servo motor.

As a result, assembly of a cylinder servo motor from one direction becomes possible, thereby improving workability.

In the cylinder servo motor according to the present invention, the ball screw nut fastening shoulder is formed on the load-side shaft end of the rotary shaft, and a fastening flange section is formed on the ball screw nut. A portion of the ball screw nut is fitted into the through hole formed in the load-side shaft end of the rotary shaft. The fastening flange section is brought into contact with and screw-engaged with the ball screw nut fastening shoulder section. Thereby, the ball screw nut is fastened to the load-side shaft end of the rotary shaft, and an oil seal is held on the load-side bracket. A lip section of the oil seal is brought into contact with an outer peripheral surface of the ball screw nut fastening flange.

As a result, the oil seal section can be shortened in an axial direction thereof, thereby rendering the cylinder servo motor more compact.

In the cylinder servo motor according to the present invention, a ball screw nut fastening shoulder is formed on a load-side shaft end of the rotary shaft, and a fastening flange section is formed at a position closer to the center of the ball screw nut. A portion of the ball screw nut is fitted into a through hole section formed in the load-side shaft end of the rotary shaft, and the fastening flange section is brought into contact with and screw-engaged with the ball screw nut fastening shoulder section. As a result, the ball screw nut is fastened to the load-side shaft end of the rotary shaft, and an oil seal is held on the load-side bracket. A lip section of the oil seal is brought into contact with an outer peripheral surface at the shaft end of the ball screw nut.

A sliding diameter of the lip section of the oil seal becomes smaller, and a circumferential speed of a contact section becomes smaller. Hence, abrasion resistance of the oil seal is improved, and the life span of the cylinder servo motor is extended.

In the cylinder servo motor according to the present invention, a detent groove is formed in an outer peripheral section of the ball screw shaft, wherein the detent groove has substantially the same depth as that of a thread groove or a depth shallower than that of the thread groove and extends in an axial direction. Further, the ball screw shaft has at least two balls to be inserted into the detent groove, and a spring for pressing the balls toward the detent groove at all times. The balls are disposed such that at least one of the balls is situated in the detent groove at all times.

Hence, the whirl stop makes rolling contact. Accordingly, abrasion of the contact surface is reduced, prolonging of the life span of a whirl stop, and friction loss of the whirl stop is diminished (by extension, input power is diminished, thereby realizing energy savings).

In the cylinder servo motor according to the present invention, a detent groove is formed in an outer peripheral section of the ball screw shaft, wherein the detent groove has substantially the same depth as that of a thread groove or a depth shallower than that of the thread groove and extends in an axial direction. Further, the ball screw shaft has at least one cylindrical ball which is to be inserted into the detent groove and is larger than a screw pitch of the ball screw shaft, and a spring for pressing the cylindrical ball toward the detent groove at all times.

Hence, one detent unit provided in the direction of the rotary shaft acts as a whirl stop. Accordingly, there can be obtained a cylinder servo motor having a shorter overall length.

BRIEF DESCRIPTION OF THE DRAWINGS

FIG. 14 is a longitudinal cross-sectional view showing a related-art cylinder servo motor.

DETAILED DESCRIPTION OF THE INVENTION (First Embodiment)

Figure 1:
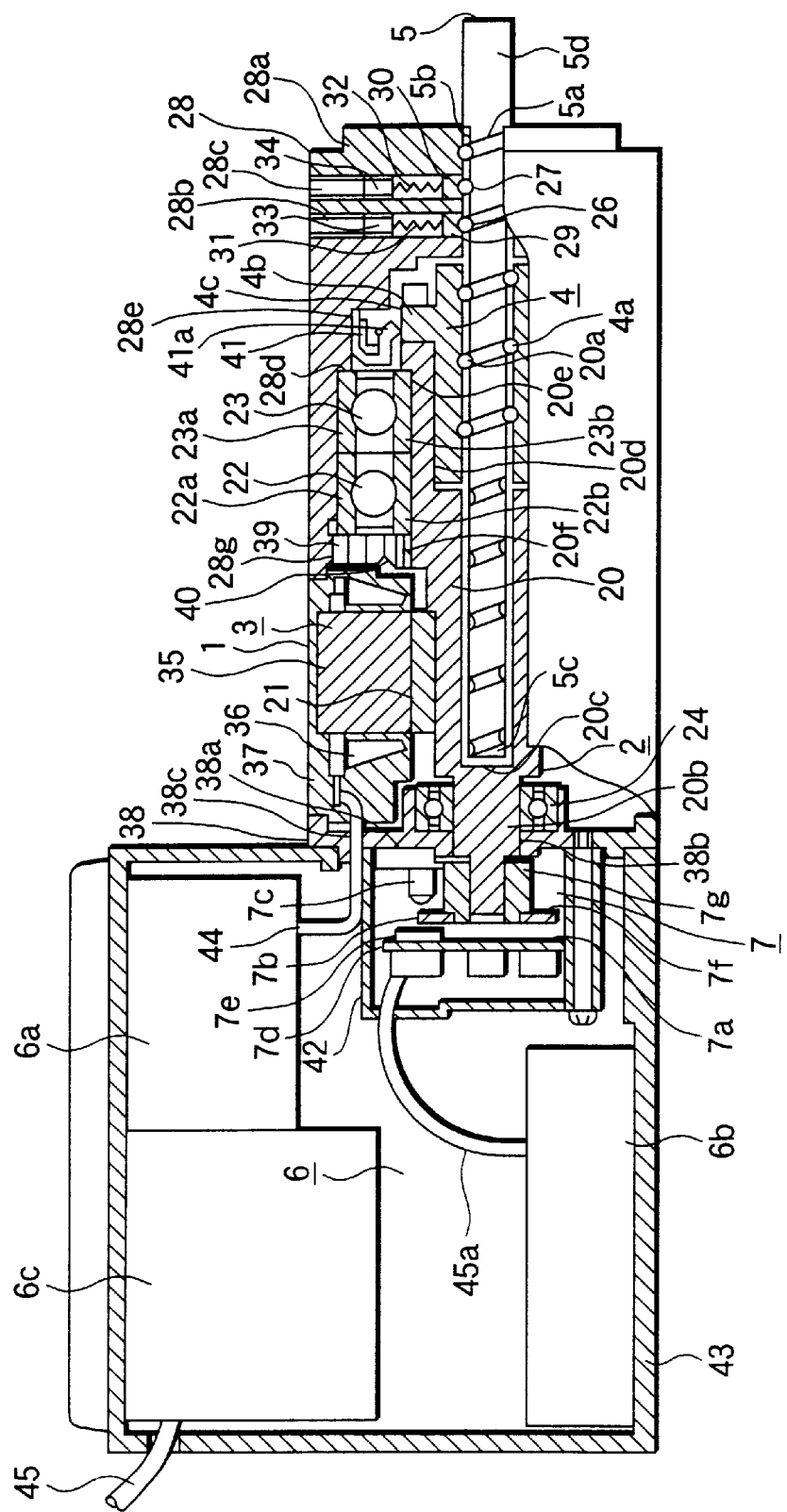
FIG. 1 is a fragmentary longitudinal cross-sectional view showing a cylinder servo motor according to a first embodiment of the present invention.
Figure 2:
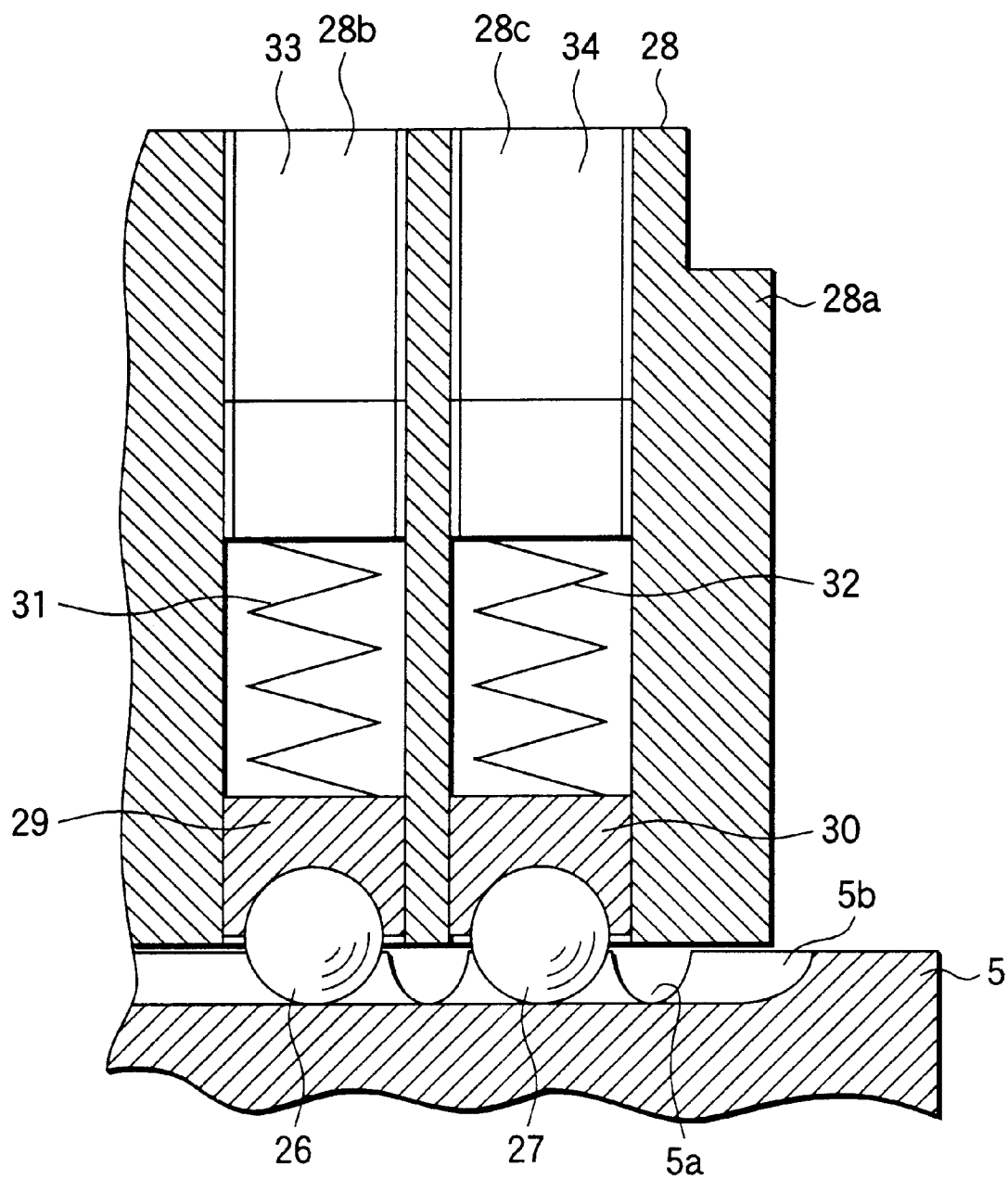
FIG. 2 is an enlarged cross-sectional view of a load-side shaft end section (a detent mechanism) of the cylinder servo motor according to the first embodiment.
Figure 3:
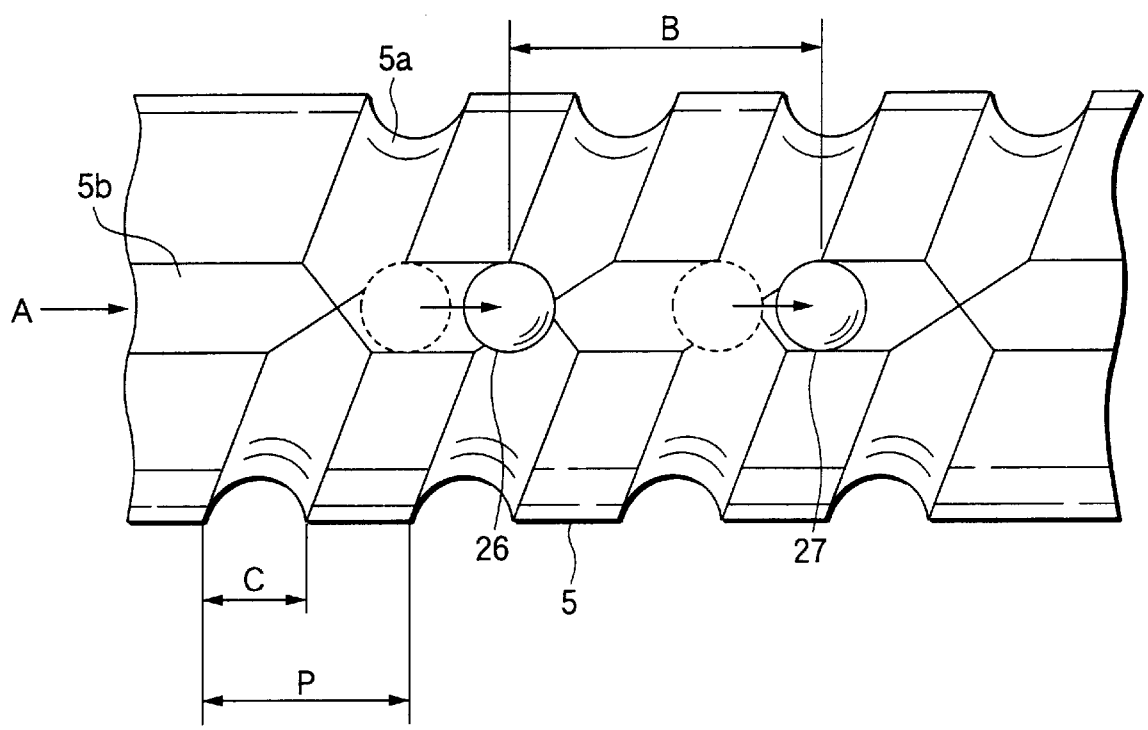
FIG. 3 is an operation descriptive view of the detent mechanism of the cylinder servo motor according to the first embodiment.
Figure 4:
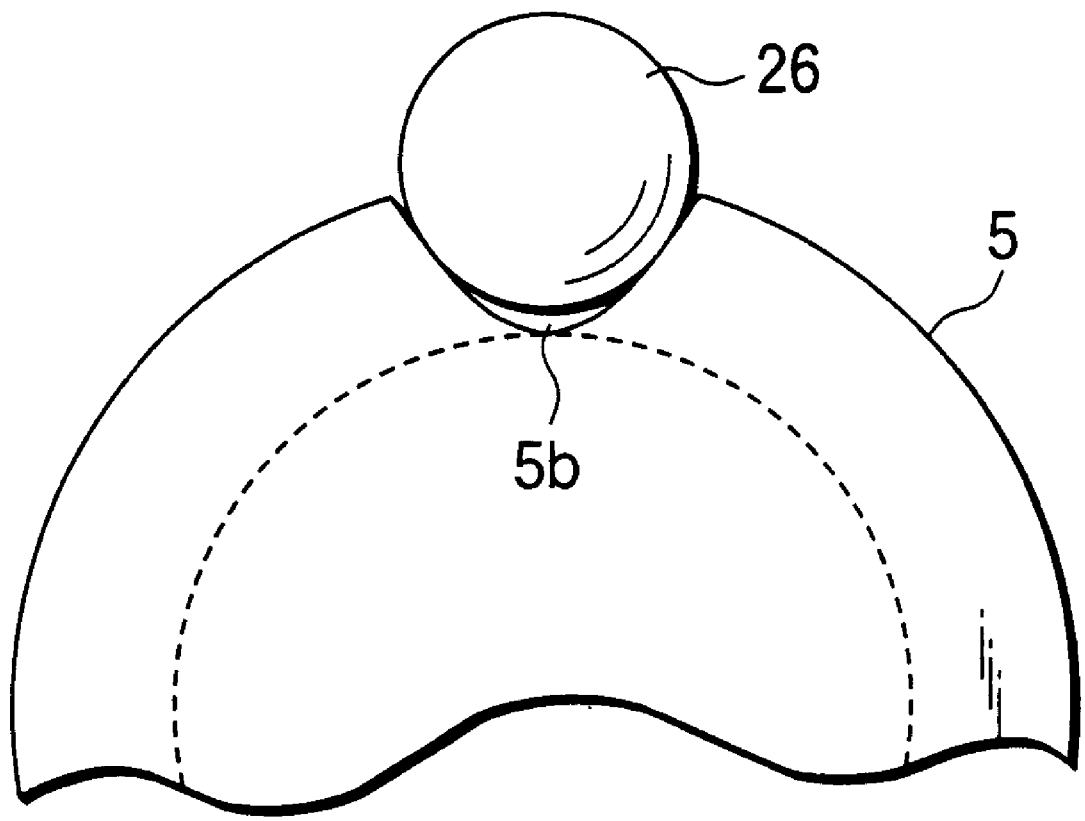
FIG. 4 is a view when viewed from direction A shown in FIG. 3.
Figure 5:
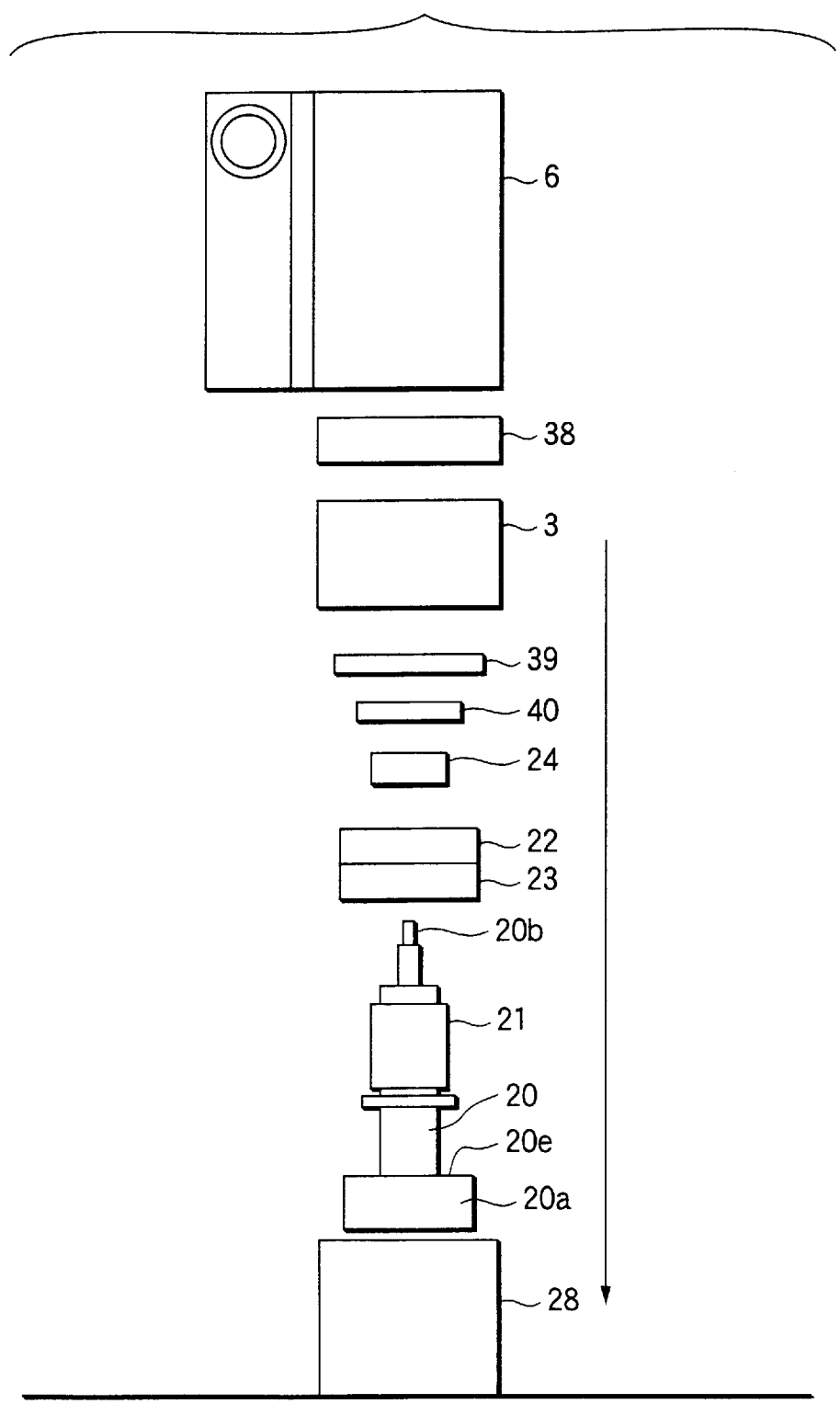
FIG. 5 is a diagram showing a method of assembling the cylinder servo motor according to the first embodiment.

A first embodiment of the present invention will be described by reference to FIGS. 1 through 5. FIG. 1 is a fragmentary longitudinal cross-sectional view of a cylinder servo motor. FIG. 2 is an enlarged cross-sectional view showing a load-side end of a shaft (a detent mechanism) ; FIG. 3 is an operation explanatory view showing the detent mechanism; FIG. 4 is a view of the detent mechanism when viewed from direction A shown in FIG. 3; and FIG. 5 is a view showing a method of assembling a cylinder servo motor.

As shown in FIG. 1, reference numeral 1 designates a servo motor having a rotor 2 and a stator 3. The rotor 2 of the servo motor 1 is constituted of a rotary shaft 20 and a permanent magnet 21 fixed on the outer peripheral section of the rotary shaft 20. The rotor 2 is rotatably supported by two load-side ball bearings 22 and 23 fitted around a road-side bracket 28 and by a non-load-side ball bearing 24 fitted around a non-load-side bracket 38. Anon-penetrating hole 20c is formed in the rotary shaft 20 so as to extend along the axis of the rotary shaft 20, from a load-side shaft end 20a to a non-load-side shaft end 20b. The non-penetrating hole 20c is formed such that an open side is greater in diameter than a closed side by only a predetermined size and such that a portion of a ball screw nut 4 to be described later can fit to the open end. The larger-diameter portion of the open side of the non-penetrating hole 20c extends to the load-side ball bearing 22 in the axial direction. Since the ball screw nut 4 is to be fastened to the load-side shaft end 20a of the rotary shaft 20, a shoulder section 20e is formed for securing an inner ring 22b of the load-side ball bearing 22 and an inner ring 23b of the load-side ball bearing 23. Further, a male screw 20f with which an inner ring fastening nut 40 is to be screw-engaged is formed in substantially the center of the rotary shaft 20. The non-load-side shaft end 20b of the rotary shaft 20 fixes a sign board 7f of an absolute rotation sensor 7 to be described later. Hence, the non-load shaft end 20b protrudes from a hole 38b of the non-load-side bracket 38 to the outside.

The stator 3 is constituted by means of winding a coil 36 around an iron core 35 and sealing the coil 36 and the iron core 35 with resin 37. The stator 3 is fitted and fixed to a load-side bracket 28 and the non-load-side bracket 38 and is disposed opposite the permanent magnet 21 of the rotor 2 with a nominal radial distance.

Reference numeral 4 designates a ball screw nut, and balls 4a of a ball circulation mechanism (not shown) are provided in an internal peripheral section of the ball screw nut 4. Further, a portion of the ball screw nut 4 is fitted into an internal peripheral section 20d of an open section of the rotary shaft 20. A flange section 4b is brought into contact with the shoulder 20e of the rotary shaft 20 and is secured on the load-side shaft end 20a of the rotary shaft 20 by means of a bolt 25 to be screw-engaged with the shoulder 20a of the rotary shaft 20.

Since the construction of the ball screw nut 4 is publicly known, detailed description of the ball screw nut 4 is omitted.

Reference numeral 5 designates a ball screw shaft. A helical thread groove 5a is formed in the outer periphery of the ball screw shaft 5 and over substantially the entire length of the ball screw shaft 5, so as to assume a predetermined lead and pitch at which the balls 4a of the ball screw nut 4 are to fit into the thread groove 5a. The ball screw shaft 5 is supported by the ball screw nut 4 so as to be movable in the axial direction by way of the balls 4a of the ball screw nut 4, such that a load-side shaft end 5d of the ball screw shaft 5 protrudes from the load-side bracket 28 and such that a non-load-side shaft end 5c is housed in the deepest end of the non-penetrating hole 20c of the rotary shaft 20. A detent mechanism, which is shown in detail in FIGS. 2 through 4, prevents rotation of the ball screw shaft 5 when the ball screw shaft 5 is moved in the axial direction.

The detent mechanism comprises a substantially V-shaped single detent groove 5b; two steel balls 26 and 27; two ball bearings 29 and 30; springs 31 and 32 for pressing the two ball bearings 29 and 30 at all times; and lock screws 33 and 34. The detent groove 5b is formed in the vicinity of the load-side shaft end 5d of the ball screw shaft 5 in parallel with the axial direction of the ball screw shaft 5. The detent groove 5b has a depth substantially identical with the depth of the thread groove 5a or a depth slightly shallower than the depth of the screw thread 5a. As shown in FIG. 4, the two steel balls 26 and 27 rotate and come into contact with the detent groove 5b at two points. Holes 28b and 28c are formed in the end of the 28a of the load-side bracket 28, and the two ball bearings 29 and 30 rotatably support the steel balls 26 and 27. The springs 31 and 32 press the two ball bearings 29 and 30 at all times. The lock screws 33 and 34 are screw-threaded into the respective holes 28b and 28c formed in the end section 28a of the load-side bracket 28, thereby adjusting a rolling contact pressure between the detent groove 5b and the two steel balls 26 and 27, from a fastening position. As shown in FIG. 3, provided that a pitch of the thread groove 5a is taken as P, an interval between the steel balls 26 and 27 is taken as B, and the width of the thread groove 5a is taken as C, the detent mechanism assumes a relationship of C<1/2P and 1.5P<B<2P. More specifically, even when the ball screw shaft 5 is located at an arbitrary position, there is ensured a dimensional relationship, in which at least one of the steel balls 26 and 27 is inevitably located in the detent groove 5b.

In relation to the load-side ball bearings 22 and 23 combined so as to support the rotary shaft 20, outer rings 22a and 23a are fixed in the direction of the rotary shaft, by means of a housing shoulder section 28d of the load-side bracket 28, and an outer ring fastening nut 39 to be screw-engaged with a female thread 28g formed in an internal peripheral wall of the load-side bracket 28. Inner rings 22b and 23b are fastened in the direction of the rotary shaft by a shoulder 20e of the rotary shaft 20 for securing the flange 4b of the ball screw nut 4 as well as by the inner ring fastening nut 40 to be screw-threaded with the male screw 20f of the rotary shaft 20. By means of setting a clamping torque of the inner ring fastening nut 40 to a predetermined value, an axial clearance between the load-side ball bearings 22 and 23 is eliminated. Further, the inner diameter of the inner ring 22b of the load-side ball bearing 22 and the inner diameter of the inner ring 23b of the load-side ball bearing 23 are set so as to become greater than the outer diameter of the permanent magnet 21 of the rotor 2.

Reference numeral 41 designates an oil seal, and the oil seal 41 is fixedly fitted to an oil seal housing 28e of the load-side bracket 28. A rip section 41a is in contact with an outer peripheral section 4c of the flange section 4b of the ball screw nut 4.

The cylinder servo motor is constituted of the foregoing constituent components.

Reference numeral 7 designates an absolute rotation sensor, and the absolute rotation sensor 7 is disposed outside the non-load side bracket 38. The absolute rotation sensor 7 comprises a light-emitting section 7c fastened to a non-external-side end face 38a of the non-load-side bracket 38; a sign plate 7f having a predetermined pattern and a rotation section 7b having a boss 7g; a detection section 7a; a light-emitting section 7c of the absolute rotation sensor 7 fastened to the non-load bracket 38 by means of a screw; and a rotation sensor cover 42 for hermetically sealing the rotation section 7b and the detection section 7a along with the non-load-side bracket 38. The sign plate 7f is fastened to the boss 7g. The boss 7g is fixedly fitted to the non-load-side shaft end 20b of the rotary shaft 20 projecting from the hole 38b of the non-load bracket 38. Thus, the boss 7g is rotatably fastened to the non-load-side shaft end 20b of the rotary shaft 20. The detection section 7a is constituted of a light-receiving section 7e which is mounted on a printed board 7d and opposes the light-emitting section 7c by way of the sign plate 7f, and rotation sensor control means.

Reference numeral 6 designates a control device section which controls the position of the servo motor 1 and which is housed and held in a chassis 43 secured on the non-external end face 38a of the non-load-side bracket 38. The control device section 6 is constituted of an inverter circuit 6a, a control circuit 6b electrically connected to the inverter circuit 6a, and a power supply circuit 6c (used as a power source for the inverter circuit 6a, the control circuit 6b, and the rotation sensor 7). The inverter circuit 6a is electrically connected to the coil 36 of the stator 3 by means of a lead wire 44, by way of a lead wire hole 38c of the non-load-side bracket 38. The control circuit 6b is electrically connected to the rotation sensor control section 9 of the rotation sensor 7 by means of a connection cable 45a and is electrically connected to the inverter circuit 6a. Further, the control circuit 6b is electrically connected to an external instruction device 19 by means of a connection cable 45.

An electric circuit of the control device section 6 and the operation of the control device section 6 are identical with those of a known control device for a servo motor. Hence, their detailed explanations are omitted here.

The cylinder servo motor according to the first embodiment is constructed in the manner as mentioned above and operates in the following manner during operation.

The instruction device 19 imparts to the control device section 6 an instruction signal for actuating the ball screw shaft 5 to a certain point. Upon receipt of the signal, the inverter circuit 6a converts input a.c. power into three-phase a.c. power consisting of, i.e., a desired frequency, a desired voltage, and a desired current. The thus-converted three-phase a.c. power is fed to the coil 36 of the stator 3 by way of the lead wire 44, thus producing a rotating field. As a result, the servo motor 1 is actuated. In association with rotation of the rotor 2, the ball screw nut 4 fastened to the load-side shaft end 20a rotates, thereby imparting thrust to the ball screw shaft 5 by way of the balls 4a. Because of static friction, the ball screw shaft 5 attempts to rotate in conjunction with the ball screw nut 4. However, the steel balls 26 and 27 are pressed to the detent groove 5b by means of the springs 31 and 32. The relationship between an interval B between the steel balls 26 and 27 and the dimension of the thread groove 5a is similar to that shown in FIG. 3, as mentioned previously. At least one of the steel balls 26 and 27 remains in the detent groove 5b wherever the ball screw shaft 5 is situated. Hence, the ball screw shaft 5 rotates directly without involving rotation of the ball screw nut 4.

When the servo motor 1 is actuated, the boss 7g and the sign plate 7f, which are fixedly fitted to the non-load-side shaft end 20b, also rotate. By means of an optical signal output from the light-emitting section 7c, the light-receiving section 7e reads a pattern of the sign plate 7f. The result of reading is converted into a photo current. The photo current is converted into a photo-voltage by means of an analog circuit (not shown) provided on a printed board 7d, and the photo-voltage is converted into rotational position data by means of a digital circuit (not shown) provided on the printed board 7d.

The thus-detected rotational position data are output to the control device 6. The control device 6 compares the rotational position data with the instruction signal, thus determining whether or not the ball screw shaft 5 has arrived at a desired rotational position. Power is fed to the coil 36 in order to actuate the ball screw shaft 5, such that a difference becomes zero. More specifically, a general servo control operation is performed.

When a difference between the rotational position data and the instruction signal has become zero, a power supply to the coil 36 is disconnected, thereby actuating the ball screw shaft 5 to the instructed position.

As has been described, in the first embodiment, a necessity of wiring a line between the servo motor 1, the rotation sensor 7, and the control device section 6 at a location to which the cylinder servo motor is to be shipped is obviated, thereby improving workability. As a result, a wiring failure, which otherwise is apt to arise at a location to which a cylinder servo motor is shipped, is prevented. Further, the wiring operation is obviated, thereby improving workability. Further, there is obviated a necessity of discussing a location where a controller is to be disposed, thereby improving the freedom of mechanical design.

Since the cylinder servo motor does not use any coupling for coupling the rotary shaft 20 with the ball screw shaft 5, which would have hitherto been employed, the cylinder servo motor becomes compact despite having a large stroke. Hence, the cylinder servo motor is wholly made compact, and the number of components is reduced.

The electric circuit of the rotation sensor 7 is doubly covered with the rotation sensor cover 42 and the chassis 43. Further, a hole is formed in the rotary shaft 20, and the hole is the non-penetrating hole 20c. Thus, good airtightness is ensured, and reliability of the cylinder servo motor against an external environment is improved.

As schematically shown in FIG. 5, the previously-described components can be assembled from one direction, thereby improving the ease of assembly of a cylinder servo motor.

More specifically, in relation to the load-side bracket 28 having a detent mechanism and the oil seal 41 incorporated therein beforehand, there can be sequentially assembled the rotor 2 having the ball screw nut 4 and the ball screw shaft 5 incorporated therein beforehand, the load-side ball bearings 22 and 23, the non-load-side ball bearing 24, the inner ring fastening nut 40, the outer ring fastening nut 39, the stator 3, the-non-load-side bracket 38, the absolute rotation sensor 7, and the control device section 6.

A rip section 41a of the oil seal 41 is in contact with the outer peripheral surface 4c of the fastening flange 4b of the ball screw nut 4. Hence, the dimension of the oil seal section can be shortened in the axial direction, thereby rendering the cylinder servo motor more compact.

Since the detent mechanism makes rolling contact, abrasion of a contact surface is diminished, thereby prolonging the life span of the detection mechanism and reducing friction loss (by extension, input power is diminished, and energy saving is attained).

(Second Embodiment)

Figure 6:
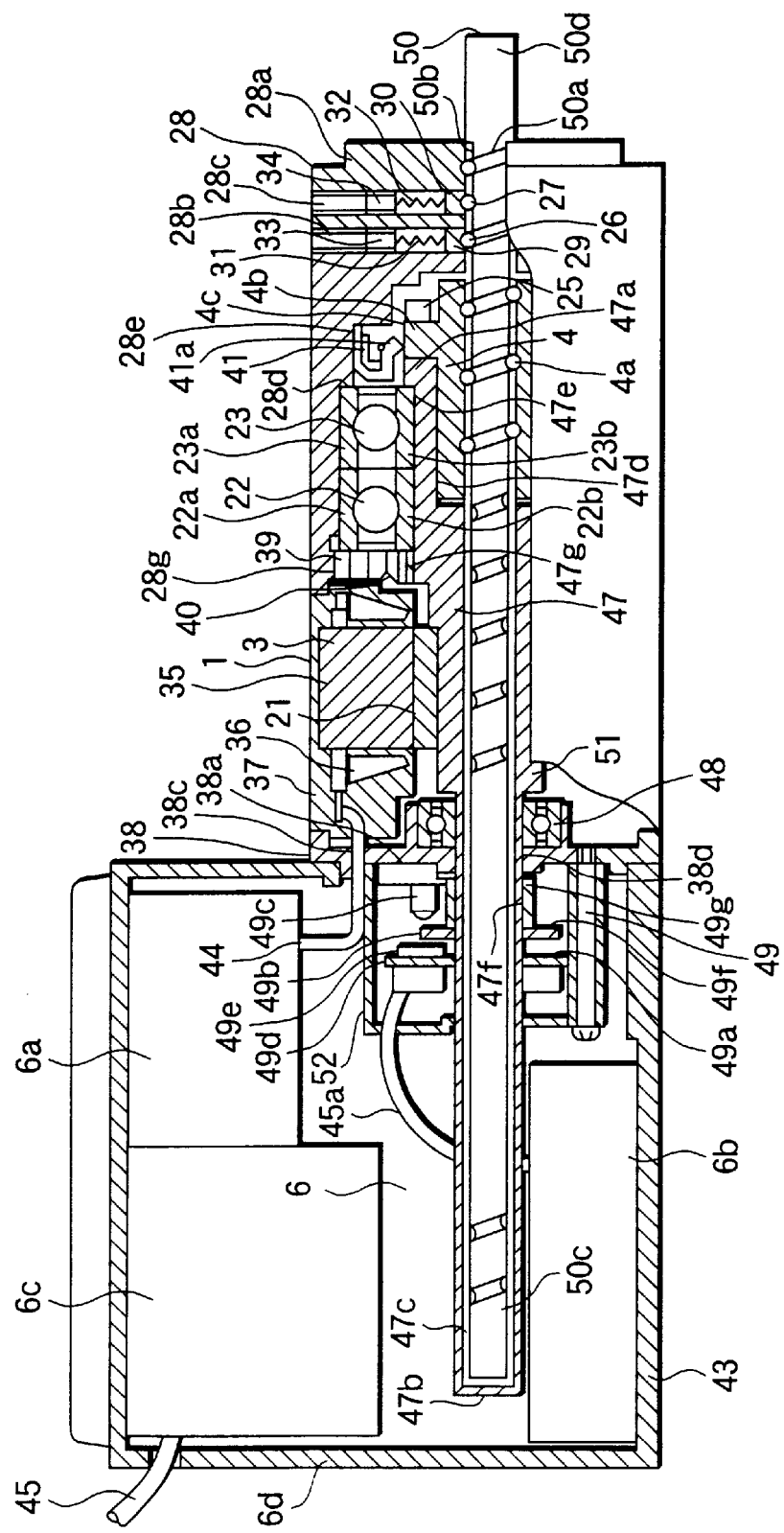
FIG. 6 is a fragmentary longitudinal cross-sectional view showing a cylinder servo motor according to a second embodiment of the present invention.
Figure 7:
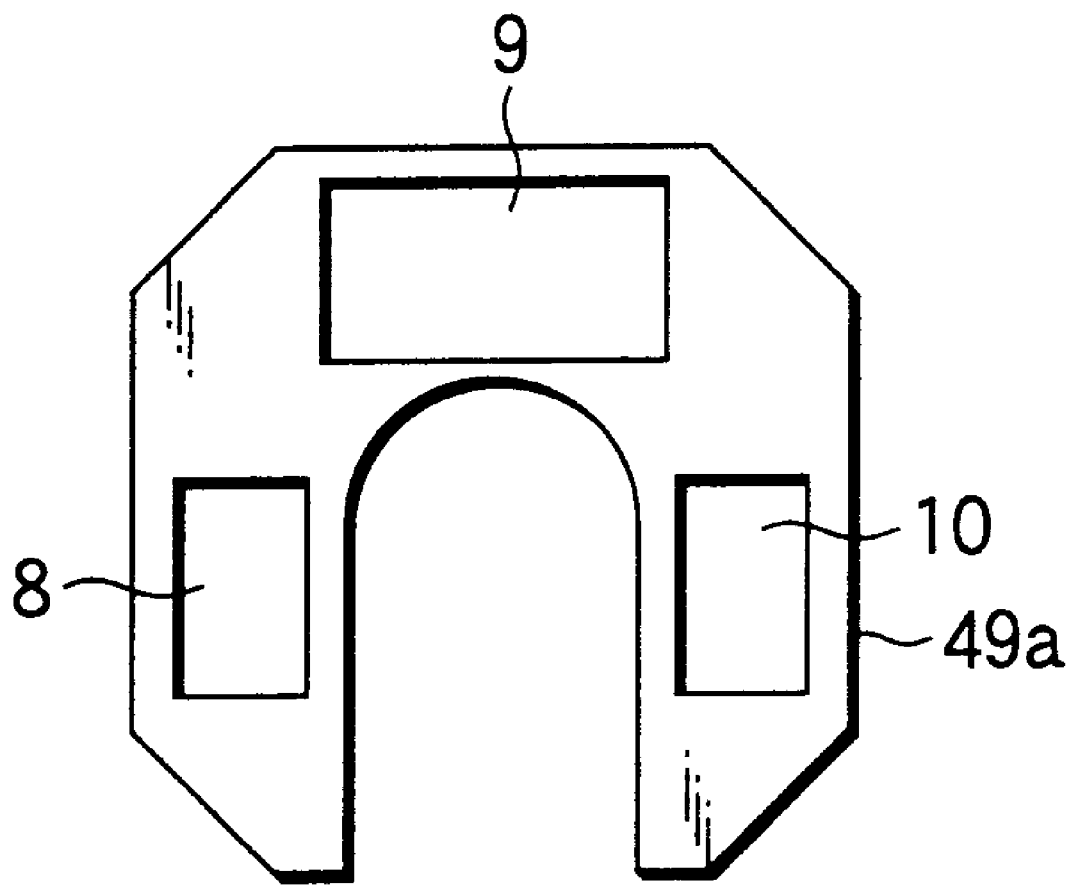
FIG. 7 is a diagram showing the geometry of a printed board used in a rotation sensor of the cylinder servo motor according to the second embodiment.

A second embodiment of the present invention will be described by reference to FIGS. 6 and 7. FIG. 6 is a fragmentary longitudinal cross-sectional view of a cylinder servo motor, and FIG. 7 is a diagram showing the geometry of a printed board used in a rotation sensor.

As shown in FIG. 6, a non-load-side shaft end 47b of a rotary shaft 47 (corresponding to the rotary shaft 20 described in connection with the first embodiment) penetrates through an absolute rotation sensor 49 (corresponding to the absolute rotation sensor 7 described in connection with the first embodiment) and extends to the neighborhood of an end section 6d of the control device section 6. In association with elongation of the rotary shaft 47, a non-load-side shat end 50c of the ball screw shaft 50 (corresponding to the ball screw shaft 5 described in connection with the first embodiment) is extended to the neighborhood of the non-load-side shaft end 47b of the rotary shaft 47. As shown in FIG. 7, a printed board 49d of the rotation sensor 49 is formed to assume a C-shaped geometry, and a hole is formed in a rotation sensor cover 52 (corresponding to the rotation sensor cover 42 described in connection with the first embodiment) so that the rotary shaft 47 can penetrate through the hole.

As shown in FIG. 6, reference numeral 47a designates a load-side shaft end; 47c designates a non-penetrating hole of the rotary shaft 47; 47d designates an internal peripheral section of the rotary shaft 47; 47e designates a shoulder section of the rotary shaft 47; 47f designates a boss mount section on the rotary shaft 47; 47g designates a male screw section of the rotary shaft 47; 48 designates a non-load-side bearing; 49a designates a detection section of the absolute rotation sensor 49; 49b designates a rotation section of the absolute rotation sensor 49; 49c designates a light-emitting section of the absolute rotation sensor 49; 49e designates a light-emitting section of the absolute rotation sensor; 49f designates a sign board of the absolute rotation sensor 49; and 49g designates a boss of the absolute rotation sensor 49; 49f designates a sign plate of the absolute rotation sensor 49; 49g designates a boss of the absolute rotation sensor 49; 50a designates a screw thread of the ball screw shaft 50; 50b designates a detent groove of the ball screw shaft 50; 50c designates a non-load-side shaft end of the ball screw shaft 50; 50d designates a load-side shaft end of the ball screw shaft 50; and 51 designates a rotor corresponding to the rotor 2 described in connection with the first embodiment. Since the cylinder servo motor according to this embodiment is substantially identical in construction with that described in connection with the first embodiment, repeated explanation thereof is omitted.

The cylinder servo motor according to the second embodiment is identical in operation with that described in connection with the first embodiment. By means of imparting a position instruction to the servo motor, the ball screw shaft 50 corresponding to the ball screw shaft 5 is actuated to a predetermined position.

As has been described, in addition to yielding the same advantage as that yielded in the first embodiment, the second embodiment also yields an advantage of the ability to realize a stroke of longer linear movement even when there is employed a cylinder servo motor of the same dimension.

(Third Embodiment)

A third embodiment of the present invention will be described through use of FIG. 8 (i.e., a fragmentary longitudinal cross-sectional view showing a cylinder servo motor).

Figure 8:
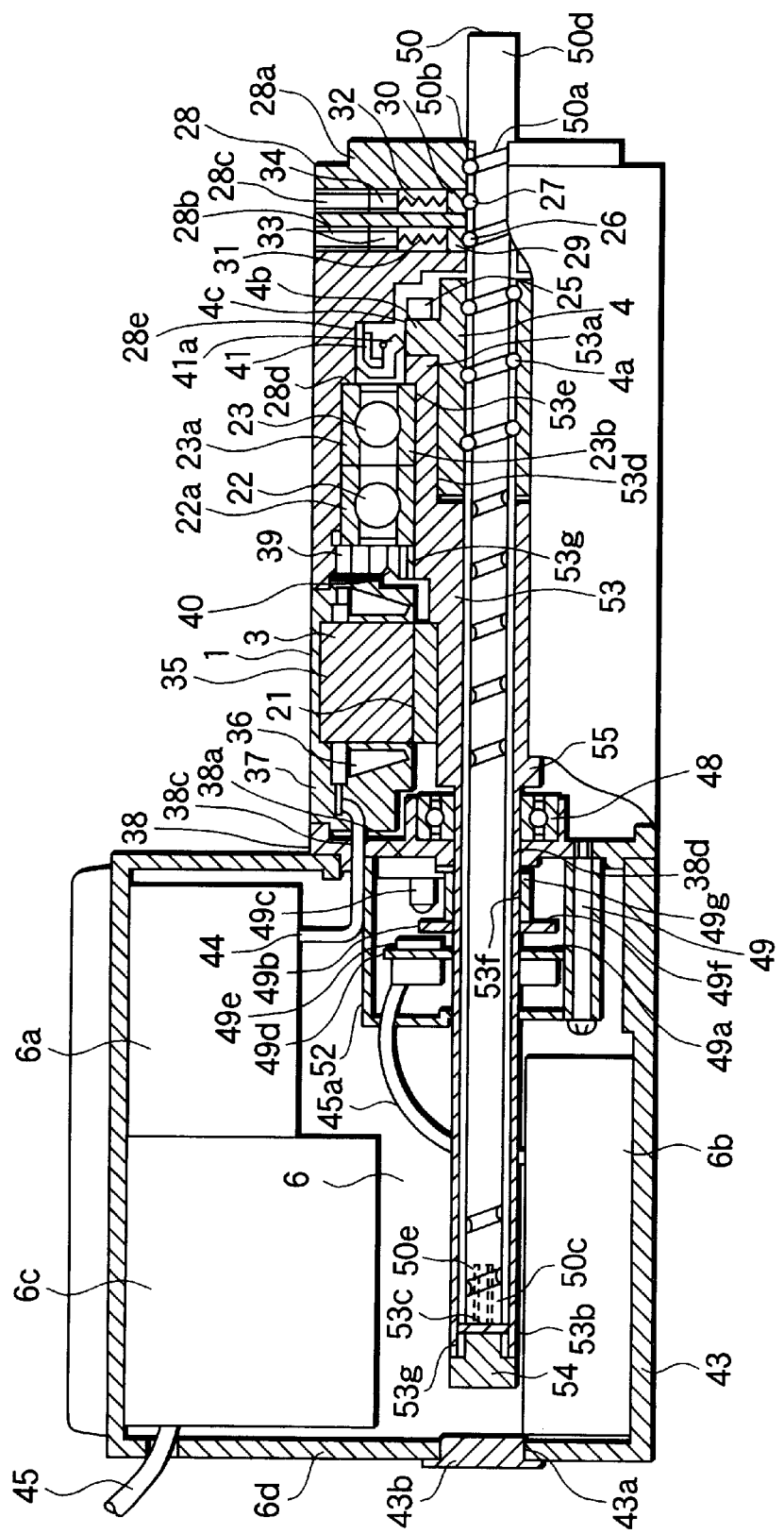
FIG. 8 is a fragmentary longitudinal cross-sectional view showing a cylinder servo motor according to a third embodiment of the present invention.

As shown in FIG. 8, a non-load-side shaft end 53b of a rotary shaft 53 (corresponding to the rotary shaft 47 according to the second embodiment) penetrates through the rotation sensor 49 and is extended to the neighborhood of the end section 6d of the control device section 6. A through hole 53c is formed in the rotary shaft 53 so as to extend from a load-side shaft end 53a to the non-load-side shaft end 53b in the direction of the rotary shaft 53.

In association with elongation of the rotary shaft 53, the non-load-side shaft end 50c of the ball screw shaft 50 is extended to the neighborhood of the non-load-side shaft end 53b of the rotary shaft 53. In order to elongate the rotary shaft 53 in the manner as mentioned above, a printed board 49d of the rotation sensor 49 is produced into a C-shaped form, as shown in FIG. 7. Further, a hole through which the rotary shaft 53 can penetrate is formed in the rotation sensor cover 52.

A female thread 53g is formed inside the non-load-side shaft end 53b of the through hole 53c. A through hole cover 54 having a male screw formed thereon is removably screw-engaged with the female thread 53g, thereby closing the non-load-side shaft end 53b of the through hole 53c.

A through hole 43a opposing the through hole cover 54 is formed in the end 6d of the chassis 43, and a removable sealing cover 43b is attached to the through hole 43a.

A female thread 50d is axially provided on the non-load-shaft end 50c of the ball screw shaft 50.

The through hole cover 54 is provided for preventing the entry of oil or an oil mist from the through hole 53c of the non-load-side shaft end 53b of the rotary shaft 53. Further, the sealing cover 43b is provided for preventing the entry of dust into the through hole 43a of the chassis 43, which would otherwise cause deterioration of the rotation section 49b of the rotation sensor 49 in an external environment. Thus, good reliability of the cylinder servo motor against the external environment; i.e., the same as described in connection with the first and second embodiments, can be maintained. As shown in FIG. 8, reference numeral 53a designates a load-side shaft end of the rotary shaft 53; 53c designates a non-penetrating hole of the rotary shaft 53; 53d designates an internal peripheral section of the rotary shaft 53; 53e designates a shoulder section of the rotary shaft 53; 53f designates a boss mount section of the rotary shaft 53; 53g designates a female thread section of the rotary shaft 53; and 55 designates a rotor corresponding to the rotor 51 described in connection with the second embodiment.

The cylinder servo motor according to the present embodiment is substantially identical in configuration with that described in connection with the second embodiment, and hence repeated explanation thereof is omitted.

In the cylinder servo motor according to the present embodiment, the sealing cover 43b is removed from the chassis 43 while the cylinder servo motor is mounted on a machine (not shown). Subsequently, the through hole cover 54 is removed, and an adjustment jig (not shown)on which is formed a male screw to be screw-engaged with the female thread 50d formed on the non-load-side shaft end 50c of the ball screw shaft 50 is attached to the ball screw shaft 50. The adjustment jig is manually pushed and pulled, thereby manually enabling direction actuation of the ball screw shaft 50.

During normal operation of the cylinder servo motor according to the present embodiment, the cylinder servo motor operates in the same manner as in the second embodiment. By means of imparting a position instruction to the cylinder servo motor, the ball screw shaft 50 is actuated to a predetermined position.

It goes without saying that the third embodiment can be applied also to the first embodiment.

In addition to yielding the same advantages as those yielded in the first and second embodiments, the third embodiment yields an advantage of the ability to enable manual positioning of the ball screw shaft 50 while the cylinder servo motor is mounted on a machine, thereby improving the workability and operability of the cylinder servo motor.

(Fourth Embodiment)

A fourth embodiment of the present invention will now be described by reference to FIG. 9 (i.e., a fragmentary longitudinal cross-sectional view of the cylinder servo motor).

Figure 9:
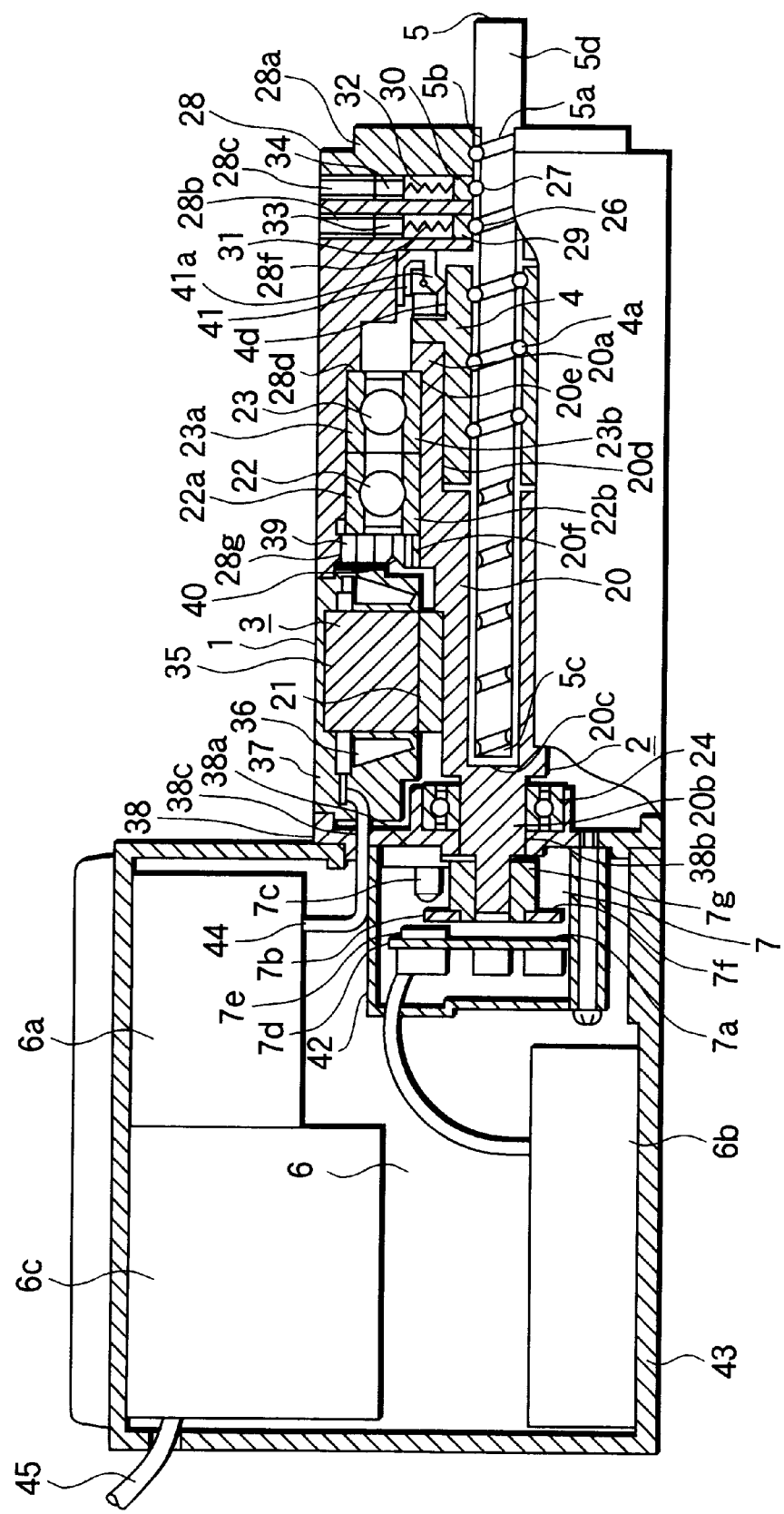
FIG. 9 is a fragmentary longitudinal cross-sectional view showing a cylinder servo motor according to a fourth embodiment of the present invention.

As shown in FIG. 9, the oil seal 41 is fixedly fitted to an oil seal housing 28f of the load-side bracket 28 and is smaller in diameter than the outer peripheral section 4c of the flange section 4b of the ball screw nut 4. A lip section 41a of the oil seal 41 remains in contact with an external outer peripheral 4d of the ball screw nut 4.

Since the cylinder servo motor according to the present embodiment is substantially identical in configuration with that described in connection with the first embodiment, repeated explanation thereof is omitted. By means of imparting a position instruction to the cylinder servo motor, the ball screw shaft 5 is actuated to a predetermined position.

Needless to say, the fourth embodiment can be applied also to the second and third embodiments.

The lip section 41a of the oil seal 41 is held in contact with the external outer peripheral surface 4d of the ball screw nut 4. Hence, the sliding diameter of a contact portion of the lip section 41a of the oil seal 41 becomes smaller, and the peripheral speed of the contact portion also becomes smaller. As a result, in addition to yielding the same advantage as that yielded in the first embodiment, the fourth embodiment yields an advantage of the ability to improve the abrasion resistance of the oil seal 41 and to prolong the life span of the cylinder servo motor.

(Fifth Embodiment)

Figure 10:
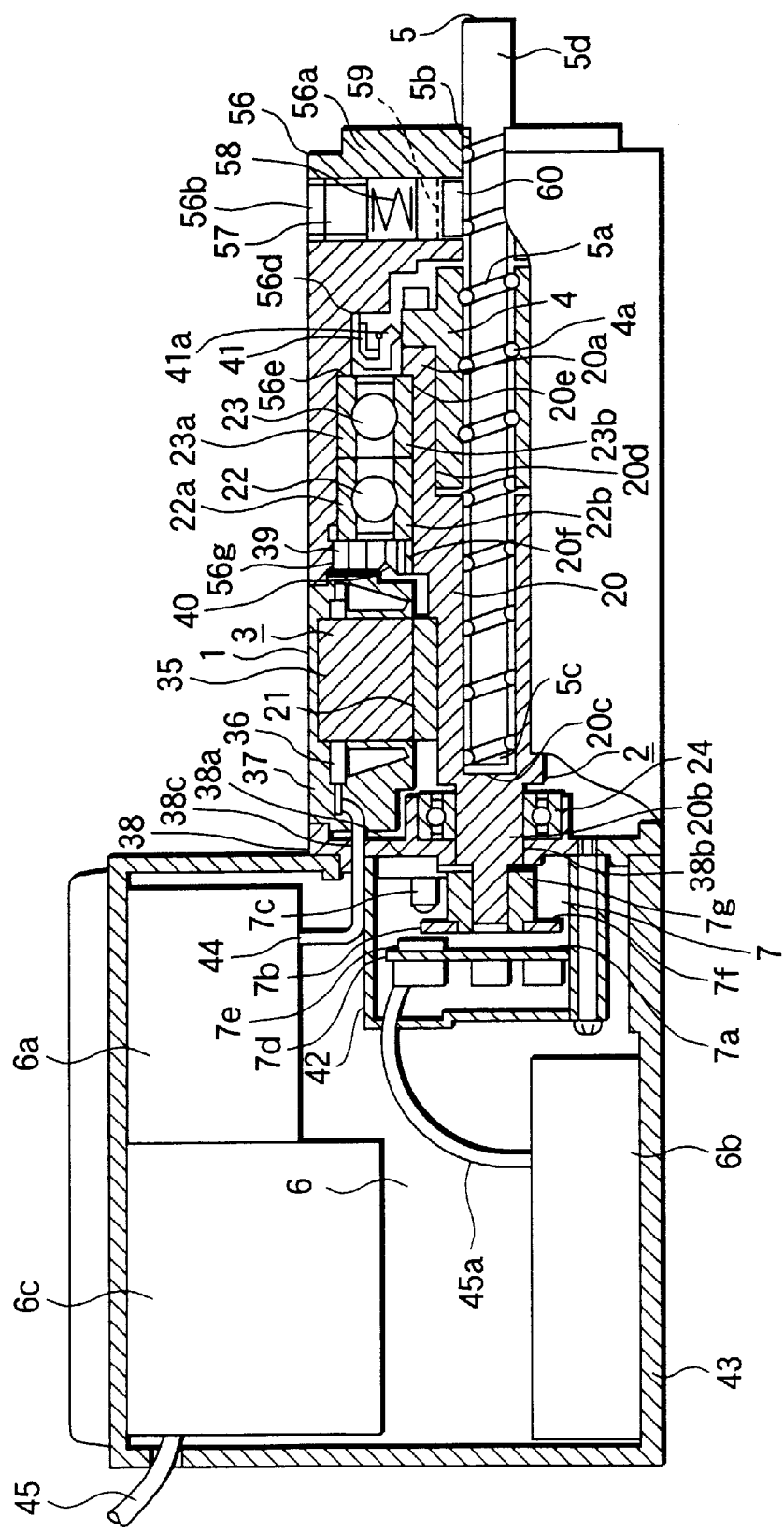
FIG. 10 is a fragmentary longitudinal cross-sectional view showing a cylinder servo motor according to a fifth embodiment of the present invention.
Figure 11:
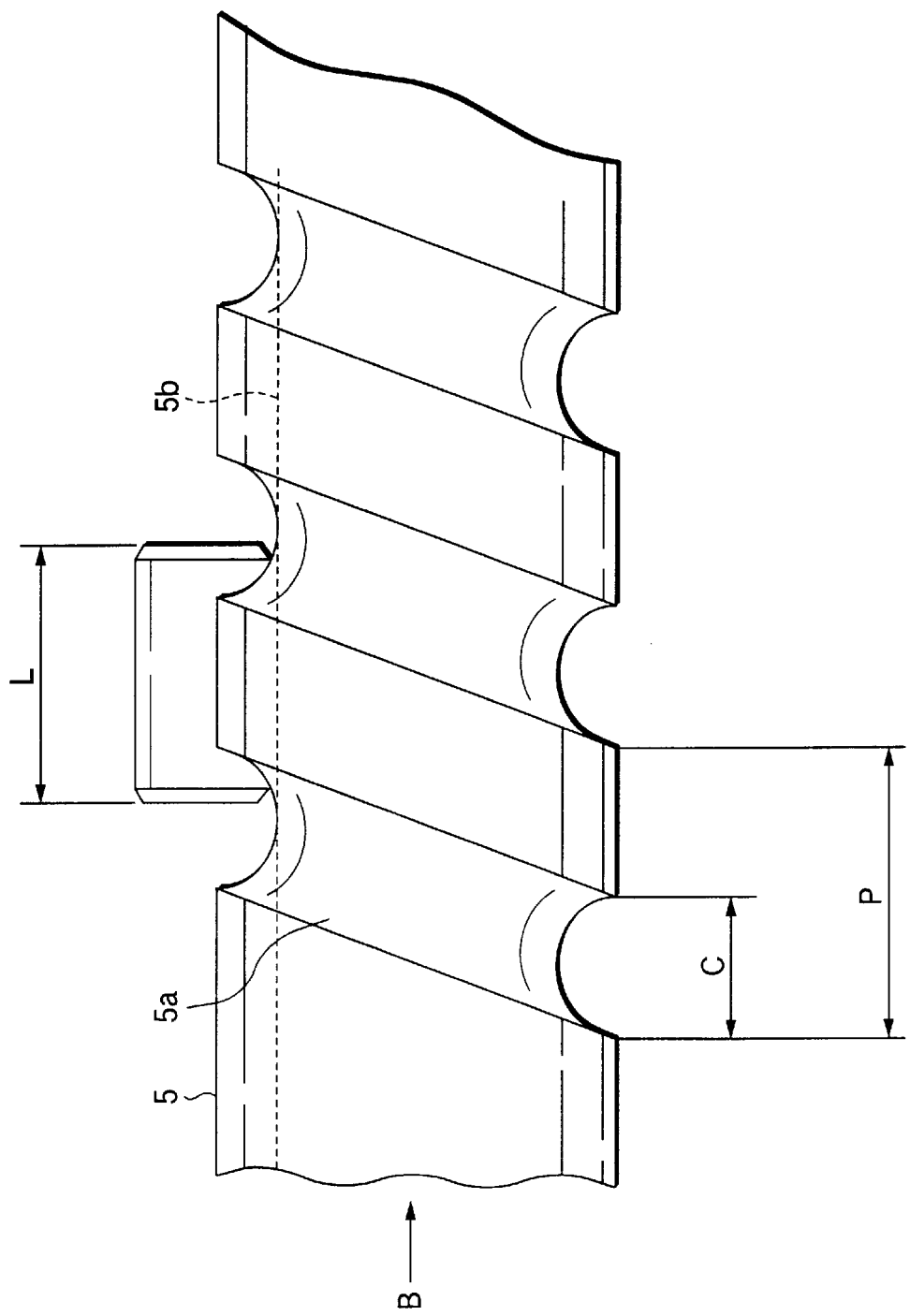
FIG. 11 is an operation descriptive view of the detent mechanism of the cylinder servo motor according to the fifth embodiment.
Figure 12:
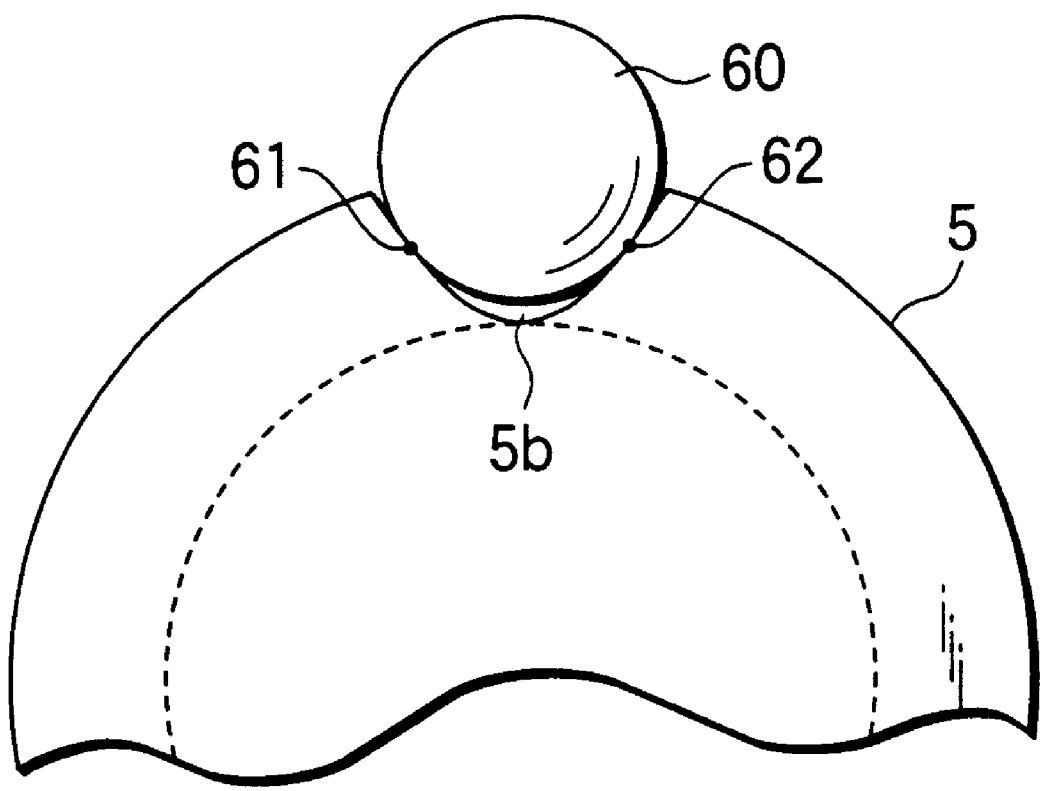
FIG. 12 is a view when viewed from direction B shown in FIG. 11.
Figure 13:
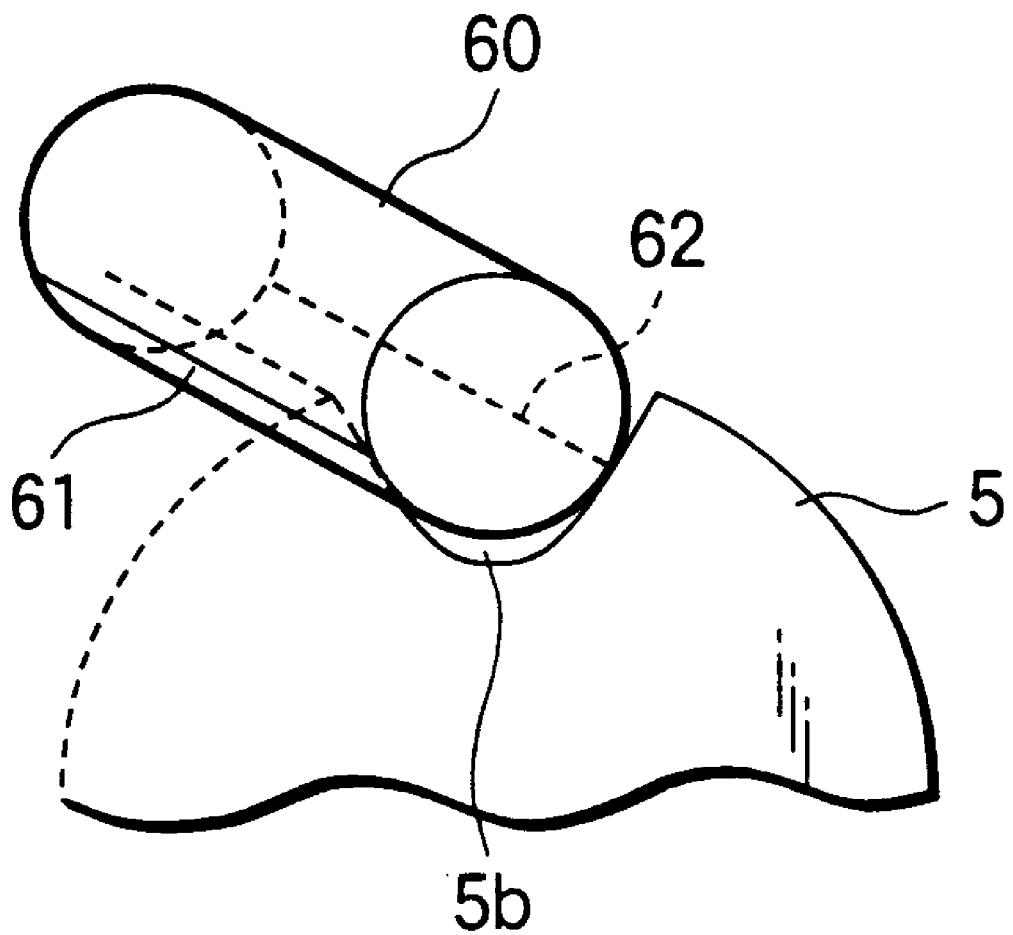
FIG. 13 is a perspective view showing that the detent mechanism of the cylinder-servo motor according to the fifth embodiment is in a contact state.

A fifth embodiment of the present invention will be described by reference to FIGS. 10 through 13. FIG. 10 is a fragmentary longitudinal cross-sectional view showing a cylinder servo motor. FIG. 11 is an operation descriptive view of the detent mechanism of the cylinder servo motor. FIG. 12 is a view from direction B shown in FIG. 11. FIG. 13 is a perspective view showing that the detent mechanism of the cylinder servo motor according to the fifth embodiment is in a contact state.

As shown in FIG. 10, rotation of the ball screw shaft 5—the shaft being supported by the ball screw nut 4 by way of the balls 4a so as to be movable in the axial direction thereof—which would otherwise be caused when the ball screw shaft 5 is moved in the axial direction thereof, is prevented by a detent mechanism shown in detail in FIGS. 11 through 13.

The detent mechanism comprises a substantially V-shaped single detent groove 5b; one cylindrical roller 60; one roller bearing 59; a spring 58 for pressing the cylindrical roller 60 at all times; and a lock screw 57. The V-shaped single detent groove 5b is formed in the neighborhood of the load-side shaft end 5d of the ball screw shaft 5 and in parallel with the axial direction of the ball screw shaft 5. The detent groove 5b has a depth substantially identical with the depth of the thread groove 5a or a depth slightly shallower than the depth of the screw thread 5a. As shown in FIG. 23, the cylindrical roller 60 comes into contact with the detent groove 5b at two contact points 61 and 62. The roller bearing 59 is provided in a hole 56b formed in an end section 56a of the load-side bracket 56 (corresponding to the load-side bracket 28 described in connection with the first embodiment). The roller bearing 59 rotatably supports the cylindrical roller 60. The lock screw 57 is screw-engaged with the hole 56b formed in the end section 56a of the load-side bracket 56 and adjusts a rolling contact pressure arising between the detent groove 5b and the cylindrical roller 60 from a fastening position. As shown in FIG. 11, provided that a pitch of the thread groove 5a is taken as P, the width of the thread groove 5a is taken as C, and the length of the cylindrical roller is taken as L, the detent mechanism assumes a relationship 2C<L<P. More specifically, even when the ball screw shaft 5 is located at an arbitrary position, there is ensured a dimensional relationship such that a portion of the cylindrical roller 50 is located in the detent groove 5b at all times.

As shown in FIG. 10, the housing shoulder 56d, the oil seal housing 56e, and the female thread 56g correspond to the housing shoulder 28d, the oil seal housing 28e, and the female thread 56g described in connection with the first embodiment.

In other respects, the cylinder servo motor according to the present embodiment is substantially identical in configuration with that described in connection with the first embodiment, and hence repeated explanation thereof is omitted.

Next will be described the operation of the cylinder servo motor. By means of imparting a position instruction to the cylinder servo motor, the rotor 2 and the ball screw nut 4 are moved in the same manner as in the first embodiment. As a result of the rotor 2 and the ball screw nut 4 rotating, thrust is imparted to the ball screw shaft 5 by way of the balls 4a. By means of static friction, the ball screw shaft 5 attempts to rotate along with the ball screw nut 4. However, the cylindrical roller 60 is pressed against the detent groove 5b by means of the spring 58, and the relationship between the length L of the cylindrical roller 60, the dimension C of the thread groove 5a, and the pitch P of the thread groove 5a is set to 2C<L<P. Hence, the contact sections 61 and 62 of the cylindrical roller 60 inevitably remain in contact with the detent groove 5b. Hence, the ball screw shaft 5 is actuated to a predetermined position without involving rotation of the ball screw nut 4.

Needless to say, the detent mechanism described in the fifth embodiment can be replaced with any of those described in connection with the second through fourth embodiments.

As has been described, in addition to yielding the same advantage as that yielded in the first embodiment (excluding the effect of the detent mechanism), the fifth embodiment yields an advantage of the ability to reduce the overall length of the cylinder servo motor, because only one detection mechanism provided in the axial direction of the rotary shaft acts as a whirl stop.

In the first through fourth embodiments, the detent mechanism is disposed in parallel with and in line with the axial direction. If at least one ball to be brought into contact with a detent groove is located in a section where the ball does not cross the detent groove, the number of detent grooves to be formed in the ball screw shaft 5 may be increased such that two detent grooves are provided so as to oppose each other or such that a plurality of detent grooves are provided radially.

The first through fifth embodiments have described the built-in control device section 6. However, if a cylinder servo motor main unit and an absolute rotation sensor are integrated together, if the control device section 6 is identified by an ID code, and if the cylinder servo motor is always used in one-to-one correspondence with the control device section 6, the control device section 6 may be separated rather than being incorporated. Even in the case of a cylinder servo motor of such a type, in the present specification a cylinder servo motor main unit, a sensor, and a control device section are referred to as being integrated.

As has been described, the present invention provides a cylinder servo motor comprising:

a servo motor having a rotor and a stator;

a cylinder servo motor main unit which is connected to a rotary shaft of the rotor of the servo motor by way of a ball screw nut and which has a ball screw shaft, the ball screw shaft moving in an axial direction;

a rotation sensor for detecting a rotary position of the servo motor; and control means for controlling the rotation sensor and the servo motor, wherein the cylinder servo motor main unit, the rotation sensor, and the control means are mechanically integrated;

the rotor of the servo motor is constituted of the rotary shaft and a permanent magnet, the rotary shaft being rotatably supported by a load-side bearing supported by a load-side bracket and by a non-load-side bearing supported by a non-load-side bracket, at least the load-side end of the rotary shaft being released, a through hole being formed in the rotary shaft so as to extend in an axial direction, and the permanent magnet being disposed opposite the stator fixed to the rotary shaft with a predetermined clearance therebetween;

the ball screw nut is constituted of a ball circulation mechanism and is mounted on a load-side shaft end of the rotary shaft;

the ball screw shaft is screw-engaged with the ball screw nut so as to become movable in only the axial direction such that a non-load-side shaft end of the ball screw shaft is housed in the through hole of the rotary shaft and such that a load-side end of the ball screw shaft protrudes from the load-side bracket;

a rotation portion of the rotation sensor is coupled to a non-load-side portion of the rotary shaft protruding from the hole formed in the non-load-side bracket and is covered with a rotation sensor cover;

the control means is disposed on apart of the non-load-side bracket distant from the stator; and the control means and the rotation sensor cover are covered with a chassis to be fastened to the non-load-side bracket. A necessity of wiring a line between the servo motor, the rotation sensor, and the control device section at a location to which the cylinder servo motor is to be shipped is obviated, thereby improving workability. As a result, a wiring failure, which otherwise is apt to arise at a location to which a cylinder servo motor is shipped, is prevented. Further, the wiring operation is obviated, thereby improving workability.

Since there is obviated use of any coupling for coupling a rotary shaft with a ball screw shaft, which would have hitherto been employed, the cylinder servo motor becomes compact despite having a long stroke. Hence, the cylinder servo motor is made compact overall, and the number of components is reduced.

The rotation portion of the rotation sensor is doubly covered with the rotation sensor cover and the chassis. Accordingly, reliability of the cylinder servo motor against an external environment is improved.

According to the present invention, the non-load-side end of the rotary shaft and the through hole are elongated to a position where the control means of the servo motor is disposed. Further, in association with elongation of the non-load-side end and elongation of the through hole, the non-load-side shaft end of the ball screw shaft is elongated. Hence, in addition to the advantages set forth, the present invention yields an advantage of the ability to realize a stroke of longer linear movement even when a cylinder servo motor of the same dimension is employed.

Further, according to the present invention, a non-load-side of the through hole of the rotary shaft is opened, and a cover for covering the open side is removably provided. Further, a through hole is formed in a portion of the chassis opposing the cover with reference to an axial direction of the rotary shaft. Moreover, the through hole formed in the chassis is removably provided with a cover. Accordingly, in addition to the advantages set forth, the present invention yields an advantage of the ability to enable manual positioning of the ball screw shaft while the cylinder servo motor is mounted on a machine, thereby improving workability and operability.

According to the present invention, the load-side shaft bearing is constituted of a ball bearing. An outer ring of the ball bearing is fixedly sandwiched between a shoulder section formed on an internal peripheral wall of the load-side bracket and an outer ring fastening nut to be screw-engaged with an internal peripheral wall of the load-side bracket. An inner ring of the ball bearing is fixedly sandwiched between a ball screw nut fastening shoulder section formed on the load-side shaft end of the rotary shaft of the servo motor and an inner ring fastening nut to be screw-engaged with the rotary shaft of the servo motor. An inner diameter of the inner ring of the ball bearing is made greater than an outer diameter of the rotor of the servo motor. As a result, in addition to the advantages set forth, the present invention yields an advantage of the ability to assemble a cylinder servo motor from one direction, thereby improving workability.

According to the present invention, the ball screw nut fastening shoulder is formed on the load-side shaft end of the rotary shaft, and a fastening flange section is formed on the ball screw nut. A portion of the ball screw nut is fitted into the through hole formed in the load-side shaft end of the rotary shaft. The fastening flange section is brought into contact with and screw- engaged with the ball screw nut fastening shoulder section. Thereby, the ball screw nut is fastened to the load-side shaft end of the rotary shaft, and an oil seal is held on the load-side bracket. A lip section of the oil seal is brought into contact with an outer peripheral surface of the ball screw nut fastening flange. As a result, in addition to the advantages set forth, the present invention yields an advantage of the ability to shorten the oil seal section in an axial direction thereof, thereby rendering the cylinder servo motor more compact.

According to the present invention, a ball screw nut fastening shoulder is formed on a load-side shaft end of the rotary shaft, and a fastening flange section is formed at a position closer to the center of the ball screw nut. A portion of the ball screw nut is fitted into a through hole section formed in the load-side shaft end of the rotary shaft, and the fastening flange section is brought into contact with and screw-engaged with the ball screw nut fastening shoulder section. As a result, the ball screw nut is fastened to the load-side shaft end of the rotary shaft, and an oil seal is held on the load-side bracket. A lip section of the oil seal is brought into contact with an outer peripheral surface at the shaft end of the ball screw nut. Hence, in addition to the advantages set forth, the present invention yields an advantage of the ability to improve abrasion resistance of the oil seal and elongate the life span of the cylinder servo motor, because a sliding diameter of the lip section of the oil seal becomes smaller and a circumferential speed of a contact section becomes low.

According to the present invention, a detent groove is formed in an outer peripheral section of the ball screw shaft, wherein the detent groove has substantially the same depth as that of a thread groove or a depth shallower than that of the thread groove and extends in an axial direction. Further, the ball screw shaft has at least two balls to be inserted into the detent groove, and a spring for pressing the balls toward the detent groove at all times. The balls are disposed such that at least one of the balls is situated in the detent groove at all times. Hence, in addition to the advantages set forth, the present invention yields an advantage of diminishing abrasion of the contact surface, prolonging the life span of a whirl stop, and diminishing friction loss of the whirl stop (by extension, input power is diminished, thereby realizing energy savings), because the whirl stop makes rolling contact.

According to the present invention, a detent groove is formed in an outer peripheral section of the ball screw shaft, wherein the detent groove has substantially the same depth as that of a thread groove or a depth shallower than that of the thread groove and extends in an axial direction. Further, the ball screw shaft has at least one cylindrical ball which is to be inserted into the detent groove and is longer than a screw pitch of the ball screw shaft, and a spring for pressing the cylindrical ball toward the detent groove at all times. Hence, in addition to the advantages set forth, the present invention yields an advantage of shortening the overall length of a cylinder servo motor, because one detent unit provided in the direction of the rotary shaft acts as a whirl stop.

INDUSTRIAL APPLICABILITY

As has been described, a cylinder servo motor according to the present invention is suitable for use with a measuring instrument, a spot welding machine, an NC machine, and a plant.

What is claimed is:

1. A cylinder servo motor comprising:
    a servo motor having a rotor and a stator;
    a cylinder servo motor main unit which is connected to a rotary shaft of the rotor of the servo motor by way of a ball screw nut and which has a ball screw shaft, the ball screw shaft moving in an axial direction;
    a rotation sensor for detecting a rotary position of the servo motor; and
    control means for controlling the rotation sensor and the servo motor, wherein
        the cylinder servo motor main unit, the rotation sensor, and the control means are mechanically integrated;
        the rotor of the servo motor is constituted of the rotary shaft and a permanent magnet, the rotary shaft being rotatably supported by a load-side bearing supported by a load-side bracket and by a non-load-side bearing supported by a non-load-side bracket, at least the load-side end of the rotary shaft being released, a through hole being formed in the rotary shaft so as to extend in an axial direction, and the permanent magnet being disposed opposite the stator fixed to the rotary shaft with a predetermined clearance therebetween;
        the ball screw nut is constituted of a ball circulation mechanism and is mounted on a load-side shaft end of the rotary shaft;
        the ball screw shaft is screw-engaged with the ball screw nut so as to become movable in only the axial direction such that a non-load-side shaft end of the ball screw shaft is housed in the through hole of the rotary shaft and such that a load-side end of the ball screw shaft protrudes from the load-side bracket;
        a rotation portion of the rotation sensor is coupled to a non-load-side portion of the rotary shaft protruding from the hole formed in the non-load-side bracket and is covered with a rotation sensor cover;
        the control means is disposed on a part of the non-load-side bracket distant from the stator; and
        the control means and the rotation sensor cover are covered with a chassis to be fastened to the-non-load-side bracket.

2. The cylinder servo motor according to claim 1, wherein the non-load-side end of the rotary shaft and the through hole are elongated to a position where the control means of the servo motor is disposed, and, in association with elongation of the non-load-side end and elongation of the through hole, the non-load-side shaft end of the ball screw shaft is elongated.

3. The cylinder servo motor according to claim 2, wherein a non-load-side of the through hole of the rotary shaft is opened; a cover for covering the open side is removably provided; a through hole is formed in a portion of the chassis opposing the cover with reference to an axial direction of the rotary shaft; and the through hole formed in the chassis is removably provided with a cover.

4. The cylinder servo motor according to any one of claims 1 through 3, wherein the load-side shaft bearing is constituted of a ball bearing; an outer ring of the ball bearing is fixedly sandwiched between a shoulder section formed on an internal peripheral wall of the load-side bracket and an outer ring fastening nut to be screw-engaged with an internal peripheral wall of the load-side bracket; an inner ring of the ball bearing is fixedly sandwiched between a ball screw nut fastening shoulder section formed on the load-side shaft end of the rotary shaft of the servo motor and an inner ring fastening nut to be screw-engaged with the rotary shaft of the servo motor; and an inner diameter of the inner ring of the ball bearing is made greater than an outer diameter of the rotor of the servo motor.

5. The cylinder servo motor according to any one of claims 1 through 4, wherein the ball screw nut fastening shoulder is formed on the load-side shaft end of the rotary shaft, and a fastening flange section is formed on the ball screw nut; a portion of the ball screw nut is fitted into the through hole formed in the load-side shaft end of the rotary shaft; the fastening flange section is brought into contact with and screw-engaged with the ball screw nut fastening shoulder section, to thereby fasten the ball screw nut to the load-side shaft end of the rotary shaft, and to thereby hold an oil seal on the load-side bracket; and a lip section of the oil seal is brought into contact with an outer peripheral surface of the ball screw nut fastening flange.

6. The cylinder servo motor according to any one of claims 1 through 4, wherein a ball screw nut fastening shoulder is formed on a load-side shaft end of the rotary shaft; a fastening flange section is formed at a position closer to the center of the ball screw nut; a portion of the ball screw nut is fitted into a through hole section formed in the load-side shaft end of the rotary shaft; and the fastening flange section is brought into contact with and screw-engaged with the ball screw nut fastening shoulder section.

7. The cylinder servo motor according to any one of claims 1 through 6, wherein a detent groove is formed in an outer peripheral section of the ball screw shaft, such that the detent groove has substantially the same depth as that of a thread groove or a depth shallower than that of the thread groove and extends in an axial direction; the ball screw shaft has at least two balls to be inserted into the detent groove, and a spring for pressing the balls toward the detent groove at all times; and the balls are disposed such that at least one of the balls is situated in the detent groove at all times.

8. The cylinder servo motor according to any one of claims 1 through 6, wherein a detent groove is formed in an outer peripheral section of the ball screw shaft, such that the detent groove has substantially the same depth as that of a thread groove or a depth shallower than that of the thread groove and extends in an axial direction; the ball screw shaft has at least one cylindrical ball which is to be inserted into the detent groove and is larger than a screw pitch of the ball screw shaft, and a spring for pressing the cylindrical ball toward the detent groove at all times.

\* \* \* \* \*